(12) United States Patent
Cowan

(10) Patent No.: US 8,985,419 B2
(45) Date of Patent: Mar. 24, 2015

(54) KIT OF PARTS, SYSTEM AND METHOD FOR PROVIDING SURVIVAL ASSISTANCE IN AN EMERGENCY

(71) Applicant: John T. Cowan, Fort Mitchell, AL (US)

(72) Inventor: John T. Cowan, Fort Mitchell, AL (US)

( * ) Notice: Subject to any disclaimer, the term of this patent is extended or adjusted under 35 U.S.C. 154(b) by 0 days.

(21) Appl. No.: 13/892,891

(22) Filed: May 13, 2013

(65) Prior Publication Data

US 2013/0302496 A1 Nov. 14, 2013

Related U.S. Application Data

(60) Provisional application No. 61/646,260, filed on May 12, 2012.

(51) Int. Cl.
| | |
|---|---|
| *A45F 3/16* | (2006.01) |
| *A45F 5/10* | (2006.01) |
| *A47J 47/14* | (2006.01) |
| *A45C 13/30* | (2006.01) |
| *A45F 5/02* | (2006.01) |

(52) U.S. Cl.
CPC .............. *A45F 5/102* (2013.01); *A47J 47/14* (2013.01); *A45C 13/30* (2013.01); *A45F 3/16* (2013.01); *A45F 5/02* (2013.01); *A45F 2200/0583* (2013.01)
USPC ........... 224/576; 224/577; 224/584; 224/666; 224/148.7

(58) Field of Classification Search
USPC ......... 224/575–578, 584, 666, 148.7; 99/339; 220/710.5; 206/546, 547
See application file for complete search history.

(56) References Cited

U.S. PATENT DOCUMENTS

| | | | | | |
|---|---|---|---|---|---|
| 1,809,596 | A | * | 6/1931 | Nason ........................... | 206/546 |
| 2,329,422 | A | * | 9/1943 | Skerfving et al. ............ | 206/546 |
| 2,814,380 | A | * | 11/1957 | Thaxton, Jr. .................. | 206/547 |
| 3,144,016 | A | * | 8/1964 | Basci ............................ | 126/265 |
| 4,643,326 | A | * | 2/1987 | Klingler ..................... | 220/710.5 |
| 5,433,339 | A | * | 7/1995 | Sarver .......................... | 220/756 |
| 8,672,135 | B1 | * | 3/2014 | Hymack ....................... | 206/542 |

* cited by examiner

*Primary Examiner* — Brian D Nash
*Assistant Examiner* — Corey Skurdal
(74) *Attorney, Agent, or Firm* — Gagnon, Peacock & Vereeke P.C.; Aaron P. Peacock

(57) ABSTRACT

The present disclosure describes a kit of parts, system and method for providing survival assistance in an emergency, the kit of parts includes a sealable container for storing emergency tools and materials therein, a lid that removably attaches to the sealable container, a collapsible band that, when expanded, slidably engages the exterior circumference of the sealable container and that, when collapsed, is stored within the sealable container, a carabiner that attaches to the collapsible band, a first reshaped paper clip that attaches to the collapsible band and edible material, a second reshaped paper cip that attaches to the collapsible band and an edible material and a wire saw that attaches to the collapsible band.

3 Claims, 10 Drawing Sheets

KIT OF PARTS, SYSTEM AND METHOD FOR PROVIDING SURVIVAL ASSISTANCE IN AN EMERGENCY

CROSS-REFERENCE TO RELATED APPLICATIONS

Applicant claims priority to U.S. Provisional Patent Application No. 61/646,260, filed May 12, 2012, the disclosure of which is incorporated by reference herein in its entirety.

BACKGROUND OF THE INVENTION

Figure 1:
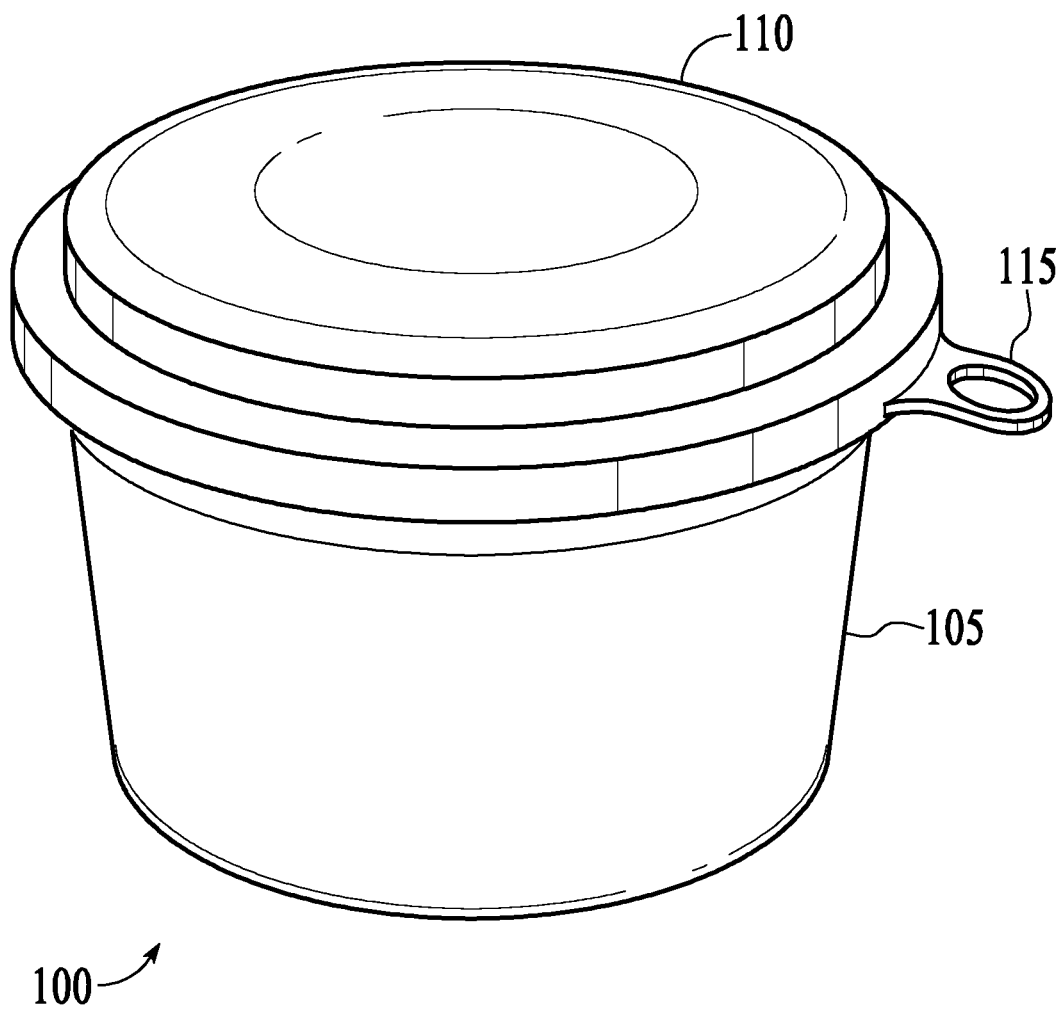
FIG. 1 is a perspective view of a kit of parts and system for providing survival assistance in an emergency, comprising an embodiment of the present invention.

Whether by unfortunate happenstance such as a tragedy or accident or by personal volition such as a planned hiking adventure into an unpopulated area, an individual may become isolated and/or removed from society and from available uses of resourceful and life-sustaining technologies, instrumentalities and tools. During this time, the individual may be in a state of near helplessness as useful instruments and/or tools are not accessible. As a result, the individual can face serious hardships and sometimes even death.

While isolated, an individual's inaccessibility to useful tools can affect the individual's well-being. Thus, without certain type of tools to aid in the performance of basics tasks of life such as in the procurement and preparation of sustenance, an individual in a secluded environment has a diminished chance of survival. In addition to affecting an individual's well-being, such useful tools also can assist the individual in addressing difficult circumstances that are encountered during the isolation.

Throughout the centuries, mankind has fashioned and created innovative tools that can be used to address various circumstances, including dangerous predicaments which can be encountered in nature. Often isolation occurs when an individual is situated on a rugged or unknown terrain such as a wooded or unpopulated area. Unfamiliar, unpopulated and/or rugged terrain can be daunting, unpredictable and dangerous. However, circumstances may arise which cause the isolation of an individual even if the terrain is known and populous. Natural disasters, accidents or other circumstances beyond one's control can cause an individual to become isolated from people, technology and valuable tools. Thus, isolation can be intentional or unintentional. Whether isolation occurs intentionally or unintentionally, an individual without the possession of the proper tools may have difficulty coping with various situations and predicament that arise, resulting in inconvenience, serious injury or even death. For example, a canteen, kettle, folding knife, fishing line, hook, bandage, blanket and compass are just some of the tools that can be of valuable use. Without the availability of such tools, various tasks such as finding and preparing food, maintaining hydration, administering remedial products and determining accurate directions would be difficult—if not impossible.

If an individual intends to venture into an isolated area for an outing such as to hike or camp, the individual may decide to gather various tools beforehand to take therewith. In doing so, the individual will have to determine what types of tools and materials to gather. However inadvertently, the individual may not gather the appropriate tools or may forget to gather certain other useful tools. Furthermore, the more tools that the individual gathers, the more space that will be needed to transport or carry such tools/items. Because space is usually very limited during an outing such as a hike into the woods, most individuals do not wish to carry or possess many tools/items due to increased space and weight associated therewith. Therefore, solely relying on the selection and possession of various tools beforehand to take therewith is neither efficient nor effective.

On the other hand, an unexpected circumstance may befall an individual, leaving the individual alone and/or isolated, without proper emergency tools. The individual may not have had an opportunity to procure the proper emergency tools beforehand. Thus, the individual is solely at the mercy of the circumstance and of nature. For example, the individual may have been in a horrific vehicular accident on a rarely traveled road that is many miles away from help. With no help arriving on the scene for an extended period of time, the individual will have to survive without the assistance of anyone or anything. Having emergency tools at the individual's disposal would greatly increase the individual's chance of survival. Taking a leisurely hike in a wooded, unpopulated area and inadvertently getting lost is another example of a unexpected circumstance. Emergency tools may greatly assist the individual in not only finding help but surviving as well.

Thus, while it benefits an individual to possess emergency tools in case an emergency arises, it is not always feasible because of the space that such tools require. For example, a hiker may only possess a backpack, and so the emergency tools that the hiker takes on the hiking trip is limited to the space provided in the backpack. As such, the limitation of space can discourage an individual from being properly prepared. While an individual may desire to possess both a canteen for drinking liquids and a kettle with lanyard for cooking over a fire, it is not feasible to possess two large emergency tool as space is usually limited What is needed is an innovative product for providing survival assistance to an individual during an emergency.

More specifically, what is needed is a kit of parts, system and method of using same that maximizes the survival assistance to an individual during an emergency while minimizing the space and inefficiencies thereof, namely, a container for storing emergency tools and materials/items therein such that the container is convertible into a plurality of differing instruments/constructs/devices by utilizing a portion of the emergency tools stored therein while also having access to the other emergency tools and materials/items stored in the container—a kit of parts, a system and method which combines many different products into one product suitable for emergency situations.

A kit of parts, system and method of using same for providing survival assistance to an individual in an emergency situation comprising a sealable, metal container that stores emergency tools/materials/items therein and that is convertible into a plurality of differing instruments/constructs/devices utilizing portion of the emergency tools originally placed therein is a novel invention that meets the needs described in the above paragraphs while providing many substantial advantages. The advantages of the embodiments of the present invention, some of which are disclosed herein, include, without limitation, all-in-one characteristics, compactness, space-saving qualities, physical composition, reusability, transportability, size adjustability, efficiency and cost-effectiveness.

First, embodiments of the present invention include an all-in-one characteristic in that a container can be converted, without limitation, to a cup having an arm to more easily drink liquids, a bucket having an arm to more easily dig, a vessel having a handle to more easily transport object(s) and a hanging kettle with lanyard to more easily heat object(s) therein over a fire while also simultaneously suspending edible material therefrom for cooking. Thus, instead of simultaneously possessing multiple products to perform multiple functions during an emergency, an individual would need only to possess an embodiment of the disclosed invention.

Second, the compactness and space-saving qualities of the embodiments of the present invention provide an advantage over the current survival assistance tools/devices/systems. Because the present invention is an all-in-one product which incorporates the functionality of the combination of a plurality of other devices, an individual can possess the present invention without having to possess those other devices simultaneously, thereby saving valuable space. The product can easily fit in a backpack, briefcase, purse, etc. As such, it is small, easy to carry and efficient.

Third, the metal composition of certain structural portions of embodiments of the present invention provides yet another advantage. Many current devices/systems/tools for providing survival assistance are composed of plastic or plastic-like material. Plastic/plastic-like material is weaker than metal and tends to chip and break when stressed. Furthermore, plastic components cannot be used in the construct of a kettle for cooking edible materials over a fire. The use of a kettle can be vitally important for survival. Therefore, the metallic composition of certain components of the present invention provides added benefits and functionality.

Fourth, the reusability of the present invention is another unique advantage. Embodiments of the present invention comprise emergency tool(s) which are used in the convertibility of a container but are collapsible for storing within the container. Therefore, a collapsible emergency tool can be stored within the container, removed from the container when needed, expanded and attached to the exterior of the container when appropriate to aid in the convertibility of the container, then collapsed and placed within the container to be stored therein until needed once again. Furthermore, because of the convertibility of the container, the invention can be used for multiple purposes on multiple occasions. Thus, the invention should not be discarded after one use but reused again and again. The invention's reusability is beneficial to an individual as the invention can be utilized continuously during a period of isolation and/or utilized multiple times over the course of multiple but different emergency situations.

Fifth, the ease of transportability and the size adjustability are additional benefits that the present invention provides. Though an embodiment of the present invention can perform multiple tasks and functions to provide assistance to an individual in an emergency situation—tasks and functions usually performed by separate devices, the present invention comprises one device—not multiple devices/products. As such, the present invention in less cumbersome to possess or carry, requiring less space and energy to transport. It can easily attach to other objects such as a belt or backpack. Moreover, the present invention is scalable in size. Therefore, the present invention can be sized according to the specific needs and wants of an individual. For example, if an individual plans to hike in a wooded area close to a populous area, the individual may desire to possess only a small emergency kit, having only essential emergency items and tools. On the other hand, a hike in a remote area of the world with little to no population of people nearby may require a larger and more all encompassing emergency kit. The present invention provides a scalability in size that is designed to meet the needs of an individual.

Sixth, because an embodiment of the present invention provides for a convertible container which performs multiple tasks and functions, efficiencies result, creating yet another advantage of the present invention. Because the invention is a substitute for multiple devices, less space is required to store and transport the invention when compared to the multiple devices that would be needed in the alternative. Furthermore, because the invention is a substitute for multiple other devices/products, an individual will not have to purchase multiple products, thereby saving money. Thus, embodiments of the present invention promote efficiencies both in cost, time and space.

Embodiments of the present invention can be provided as a kit of parts and then assembled when necessary. Using different emergency tools stored within a container, the present invention can provide emergency assistance to an individual in different, particular ways. Whether in need of a container for storing emergency tools and items therein, a cup with an arm for drinking liquid, a bucket with an arm for digging, a vessel with a handle for transporting an object, a kettle with lanyard for boiling liquid and/or suspending edible material over a fire for cooking, an embodiment of the present invention can provide assistance in a time of emergency.

DETAILED DESCRIPTION

While the present invention encompasses numerous embodiments involving a kit of parts, system and method for providing survival assistance in an emergency, one particular embodiment disclosed herein is a kit of parts, system and method comprising a metal, sealable container, collapsible band, carabiner, plurality of reshaped paper clips and wire saw. A person having ordinary skill in this art will appreciate that while the embodiment disclosed herein utilizes a certain kit, system and method to create the invention disclosed herein, other emergency tools can be used to achieve the same results.

Turning now to FIG. 1, an illustration is shown that depicts a kit of parts and system 100 for providing survival assistance to an individual. Specifically, a sealable, metal container 105 is shown with a lid 110 attached thereto. The lid 110 can comprise a finger 115 that protrudes therefrom. The finger 115 permits the lid 110 and the metal, sealable container 105, if attached to the lid 110, to be more easily transported and/or carried. For example, if attached to an object such as a backpack or a belt, the present invention can be easily transported and will not be easily forgotten or left behind.

Figure 2:
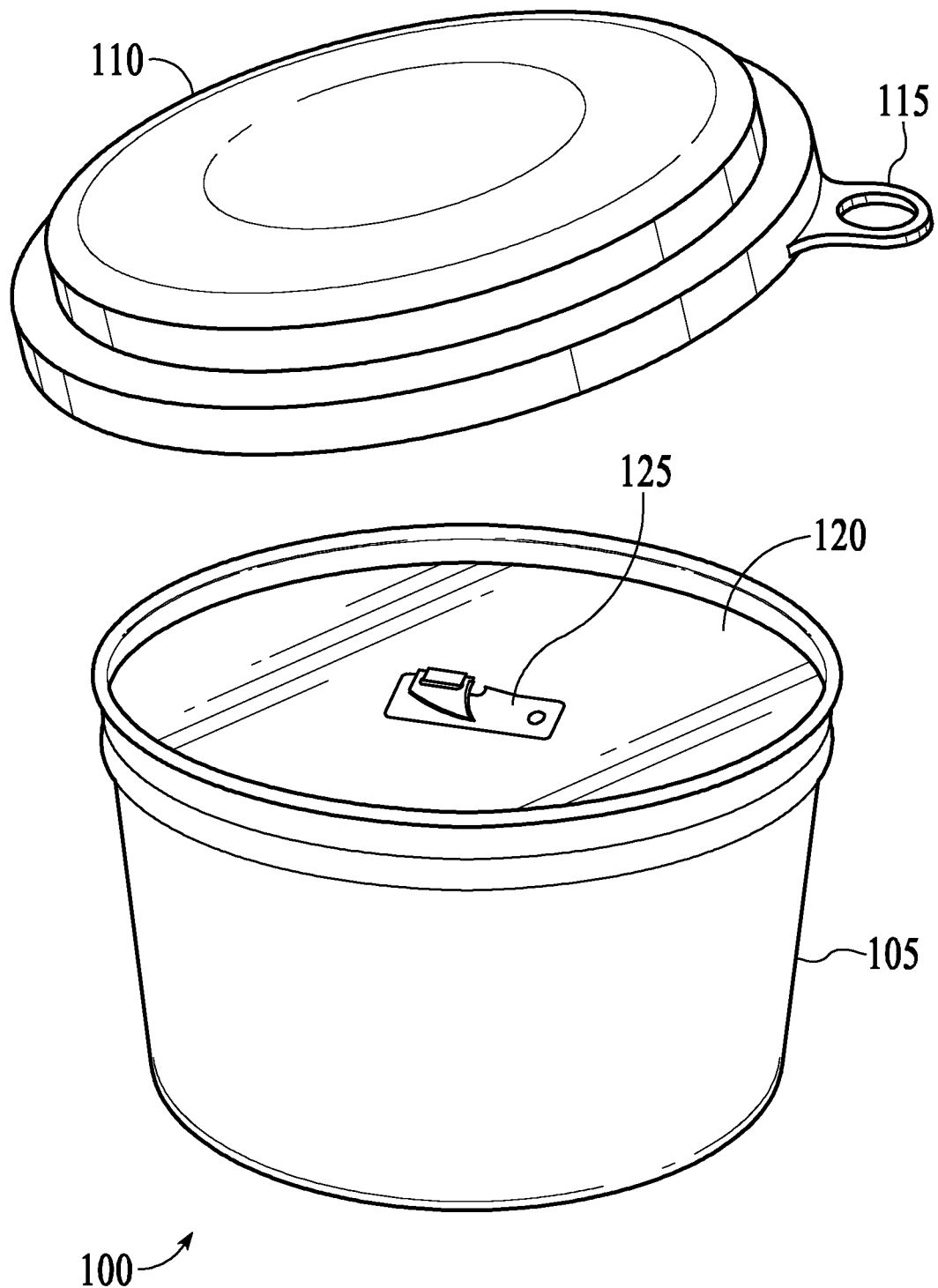
FIG. 2 is a partially exploded perspective view of the kit of parts and system wherein a sealable, metal container is hermetically sealed.
Figure 3:
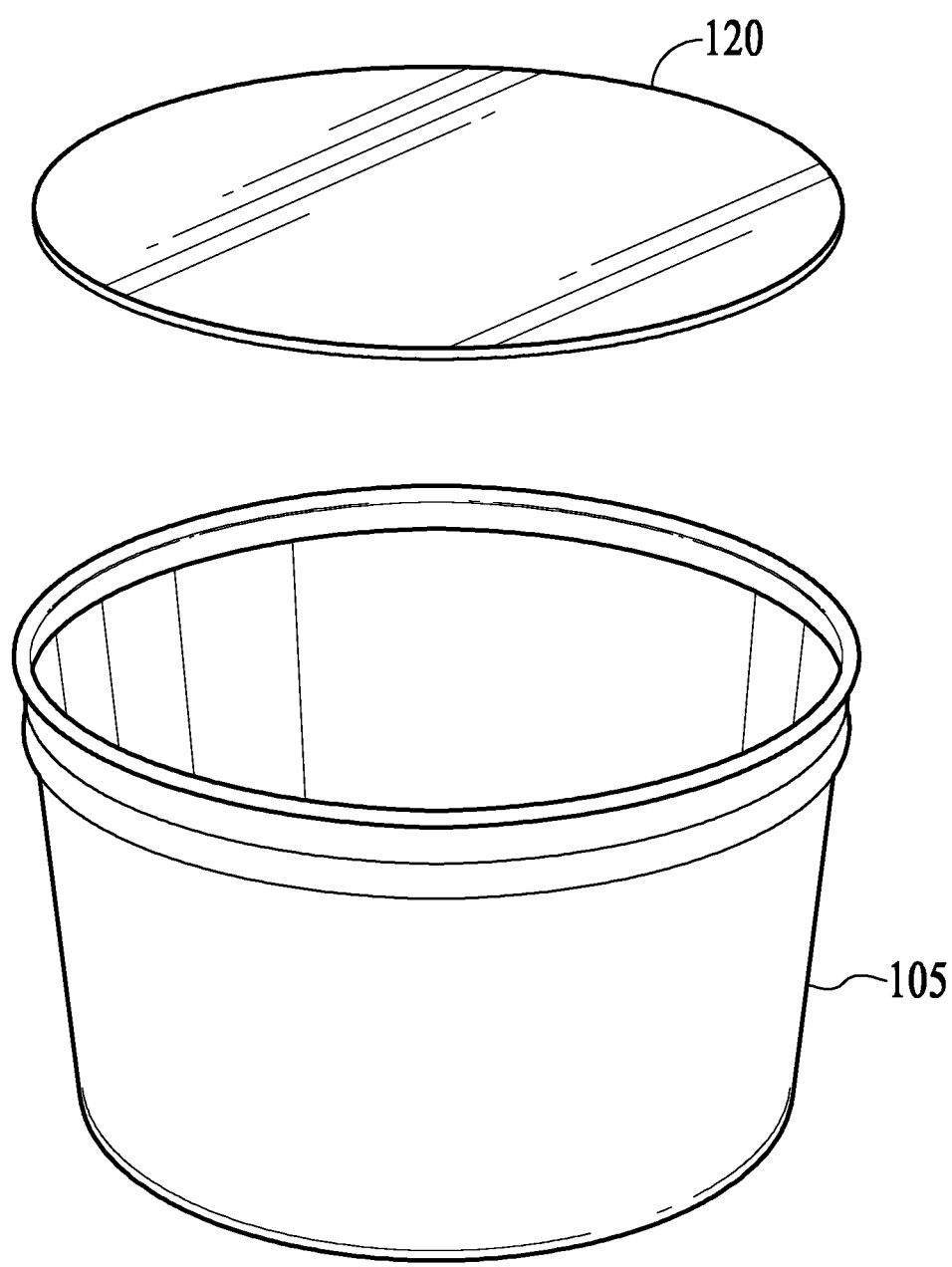
FIG. 3 is a partially exploded perspective view of the kit of parts and system depicting the initial unsealing of the sealable, metal container.

FIG. 2 depicts a partially exploded view of a kit of parts and system 100 comprising a sealable, metal container 105 that is hermetically sealed. The lid 110 has been detached, exposing the top portion 120 of the container 105, which is shown as sealed by the top portion 120. Positioned on the top portion 120 of the container 105 and attached thereto using an adhesive is a can opener 125 for removing the top portion 120 and unsealing the container 105. The can opener 125 can be detached from the top portion 120 and used to unseal the container 105. The container 105 can be resealed by reattaching the lid 110 thereto. FIG. 3 depicts the removal of the top portion 120 from the container 105. Furthermore, artisans having ordinary skill in this particular art will appreciate that the lid 110 can also be a pop lid.

Within the container 105 are emergency items/tools/materials. The items/tools/materials are stored therein for use at the appropriate time. These items/tools/materials can be used also to aid in the transformation/conversion of the container 105. Depending upon the size of the container 105, a predetermined amount of emergency items/tools/materials can be stored therein. For example, a container can comprises the following items/tools/materials therein, without limitation: cutting utensil, arrow point, signal reflector, fishing lure, trigger for snares or traps, carabiner, collapsible band, wire saw, snare, hand saw, bow saw, compass, folding knife, scraper, ten foot para cord, emergency blanket, pack of gum, candy, first aid information sheet, fire starter, gauze, alcohol swab, adhesive bandages, adhesive tape, fishing line, sinkers, needles, safety pins, paper clips, matches, candle, soup cube, foil, thermometer, flashlight, whistle, minor, pencil, toilet paper and screwdriver multibit set. Not all of the above items/tools/materials may be placed and stored in the container 105, depending upon the size of the container 105.

Figure 4:
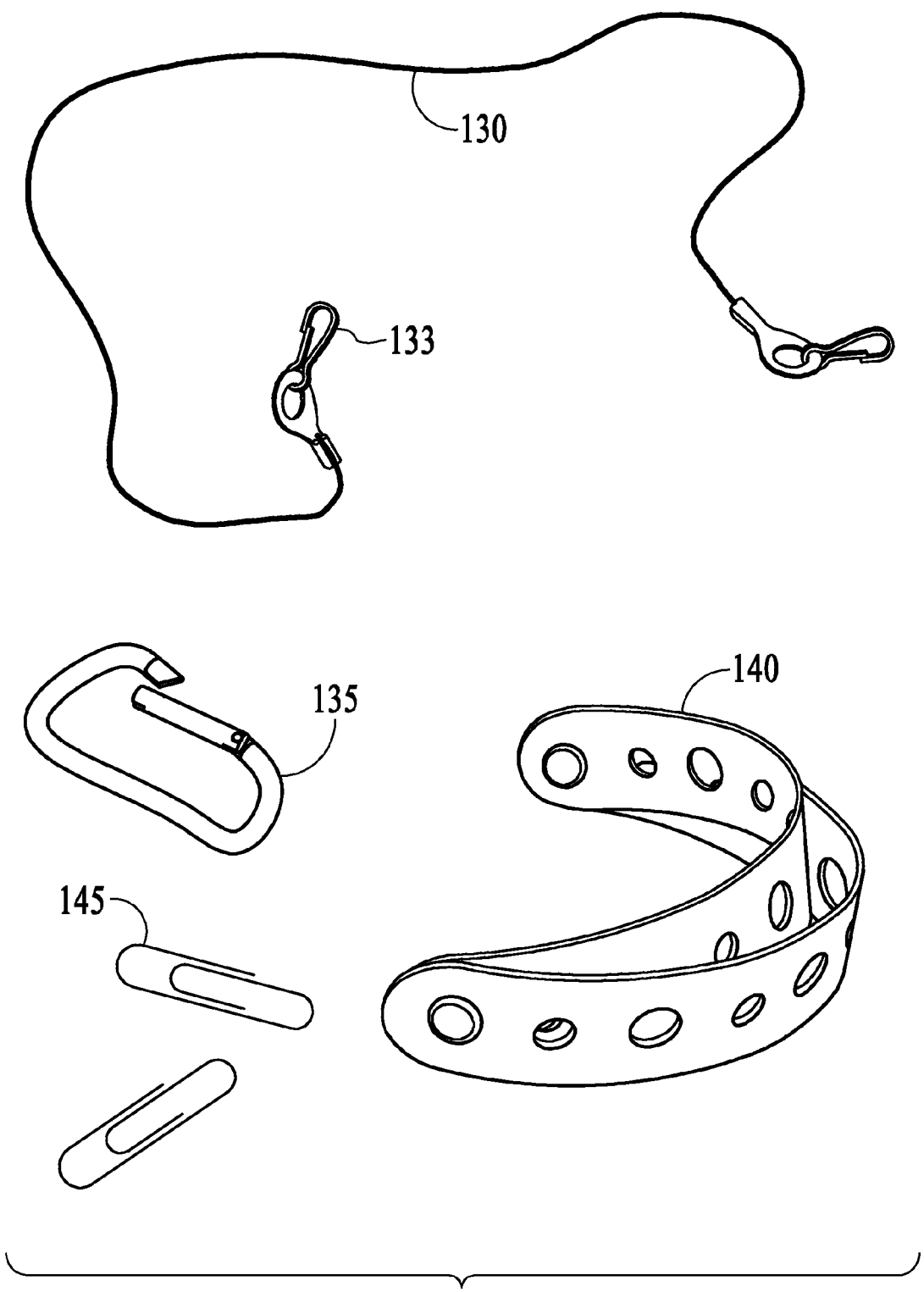
FIG. 4 is a perspective view of a selection of tools included in an embodiment of the present invention.

FIG. 4 depicts certain tools that are used for the conversion of the container 105. Depicted is a wire saw 130 having claps 133 at each end, a carabiner 135, a collapsible band 140 shown in a collapsed state and two paper clips 145. These tools are stored in the container 105 until one or more is needed. When needed, an individual can open the container 105, retrieved the tools and utilize the tools in conjunction with the present invention 100.

Figure 5:
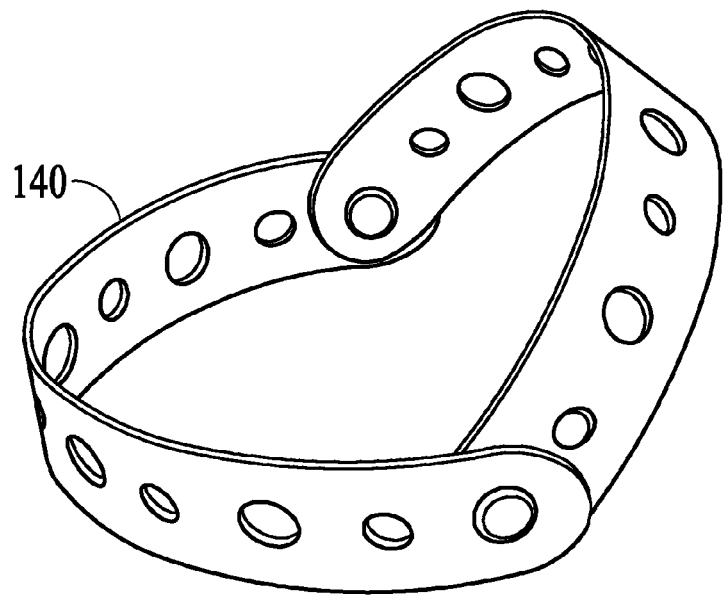
FIG. 5 is a perspective view of a collapsible band comprising a tool included in an embodiment of the present invention.

FIG. 5 illustrates a unique tool that an embodiment of the present invention can comprise, namely, the collapsible band 140. As shown, the collapsible band 140 is designed to collapse, thereby allowing it to be placed and stored within the container 105, as well as expanded, thereby allowing it to engage the exterior of the container 105. As shown, the collapsible band 140 comprises two curved portions connected together by pin joints. When expanded, the collapsible band 140 forms a circumference that is substantially the same as the circumference of the container 105. Also, the collapsible band 140 defines a plurality of apertures thereon, thereby permitting objects to attach thereto via a hook, clasp, carabiner, paper clip, etc.

The collapsible band 140 can comprise one or more mounting members for mounting wire loop(s) thereto. A mounting member mounts a wire loop to the collapsible band 140. Once a wire loop is mounted to the collapsible band 140 via a mounting member, a clasp 133 positioned at one end of the wire saw 130 can be attached easily to the wire loop, thereby connecting the wire saw 130 to the container 105.

Figure 6:
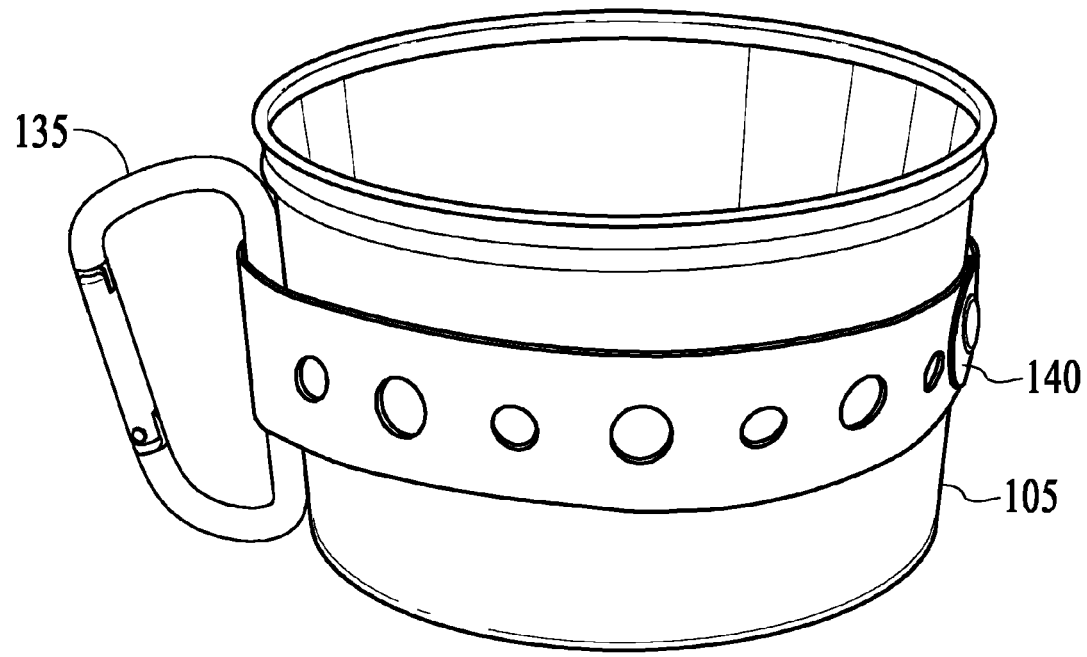
FIG. 6 is a perspective view of a sealable, metal container converted into a cup for providing assistance in drinking or digging, comprising an embodiment of the present invention.
Figure 7:
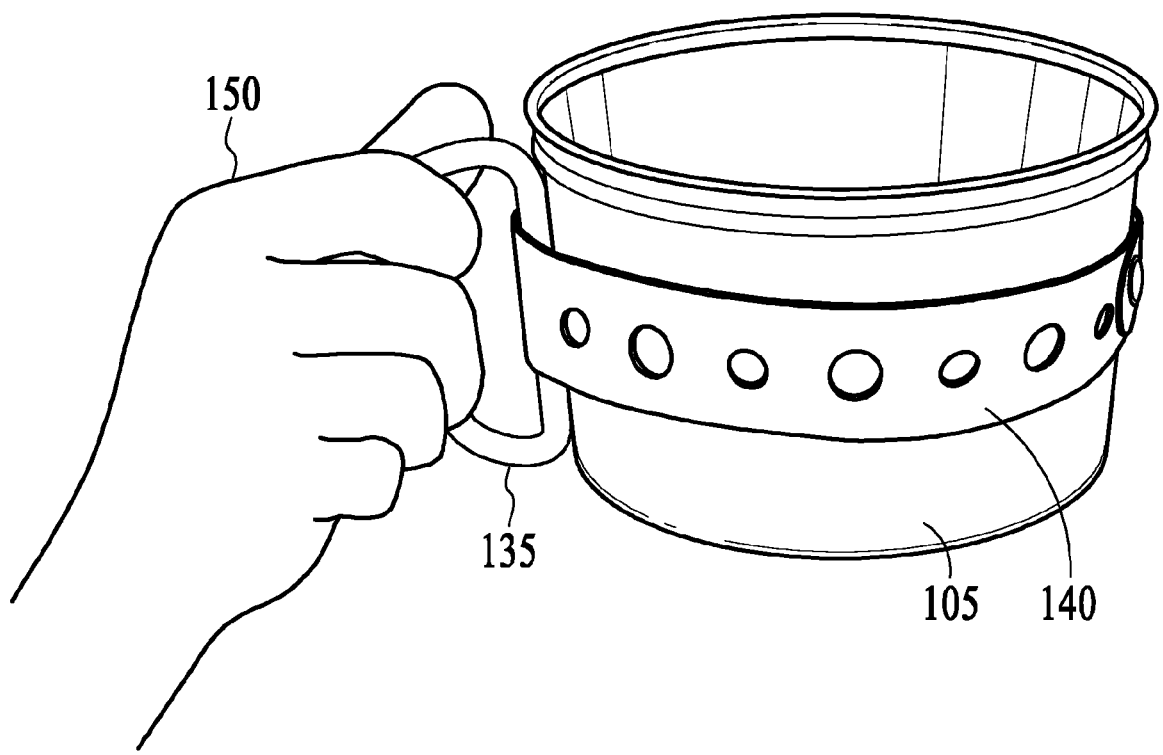
FIG. 7 is a perspective view of the cup of FIG. 6 in use.

FIG. 6 depicts a sealable, metal container 105 converted into a cup with an arm to allow an individual to more easily consume liquids. Specifically, a collapsible band 140 is removed from the sealable, metal container 105, expanded and then slidably engaged to the exterior circumference of the container 105. A carabiner 135, also removed from the inside of the container 105, is attached to the collapsible band 140 by fitting a portion of the carabiner 135 between the container 105 and the collapsible band 140. As illustrated in FIG. 7, an individual can more easily and effectively lift the container 105 by hand 150 to consume liquids contained therein. This embodiment of the present invention not only provides advantages for drinking but also for digging. With the carabiner 135 acting as an arm for the container 105, an individual is able to apply force more effectively to the container 105, thereby aiding the individual in the digging process.

Figure 8:
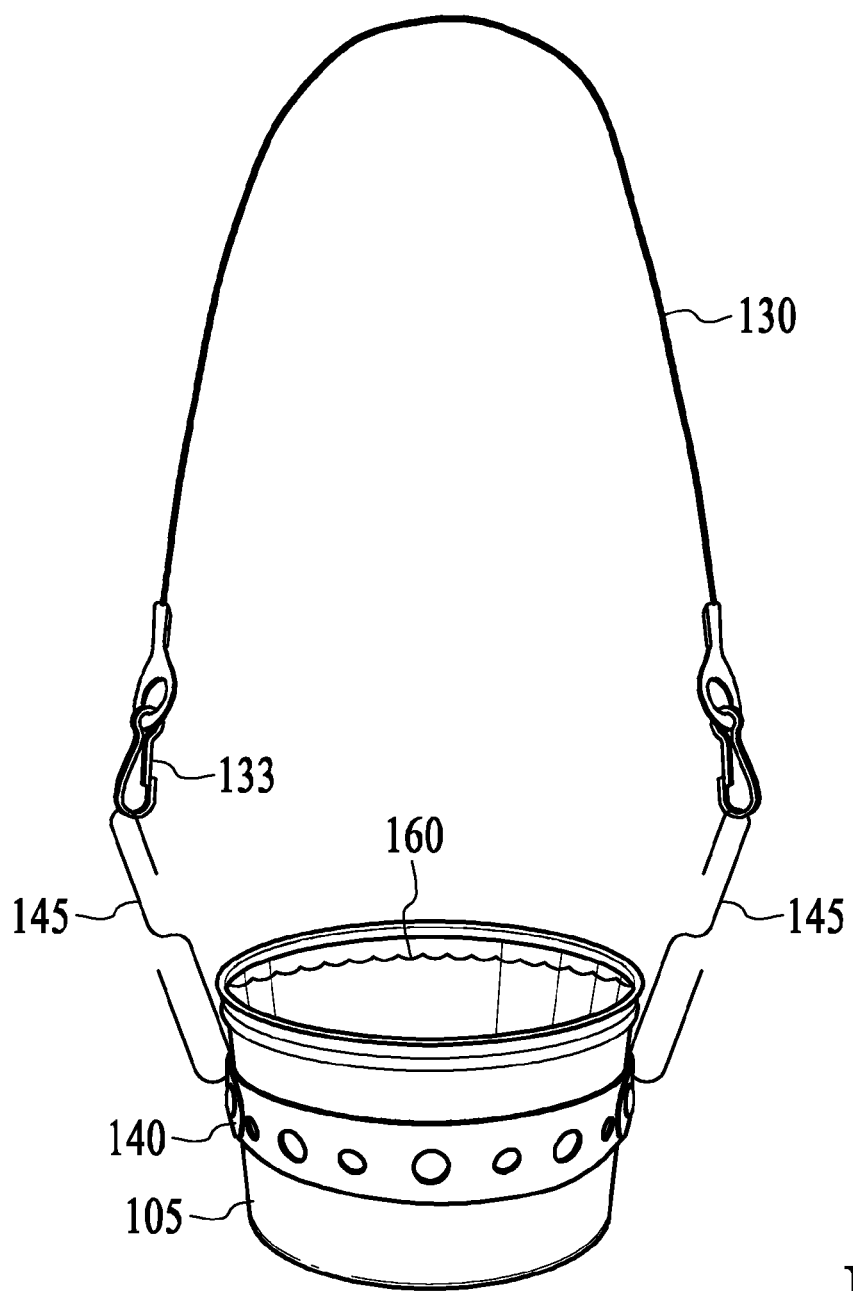
FIG. 8 is a perspective view of a sealable, metal container converted into a kettle with lanyard for providing assistance in cooking, comprising an embodiment of the present invention.
Figure 8:
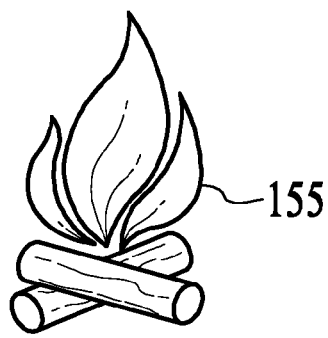

Embodiments of the present invention provide an individual with assistance in heating/cooking materials within the container 105 in an emergency situation. As shown in FIG. 8, a collapsible band 140 is removed from the sealable, metal container 105, expanded and then slidably engaged to the exterior circumference of the container 105. Two paper clips 145, which previously had been placed in the container 105 for storage, are removed from the inside of the container 105 and reshaped so that each end thereof forms a hook. One end of each reshaped paper clip 145 is attached to the collapsible band 140 by fitting a portion of hooked end through one of the plurality of apertures which defines the collapsible band 140. The other end of each reshaped paper clip 145 is attached to a wire saw 130 having a clasp 133 at each end by fitting the hook portion through the clasp 133. Thus, the container 105 is converted into a hanging/suspended kettle with lanyard for boiling liquids over a fire. Also, it should be mentioned that the wire saw 130 can be attached to the collapsible band 140 instead of the reshaped paper clips 145 if necessary.

Figure 9:
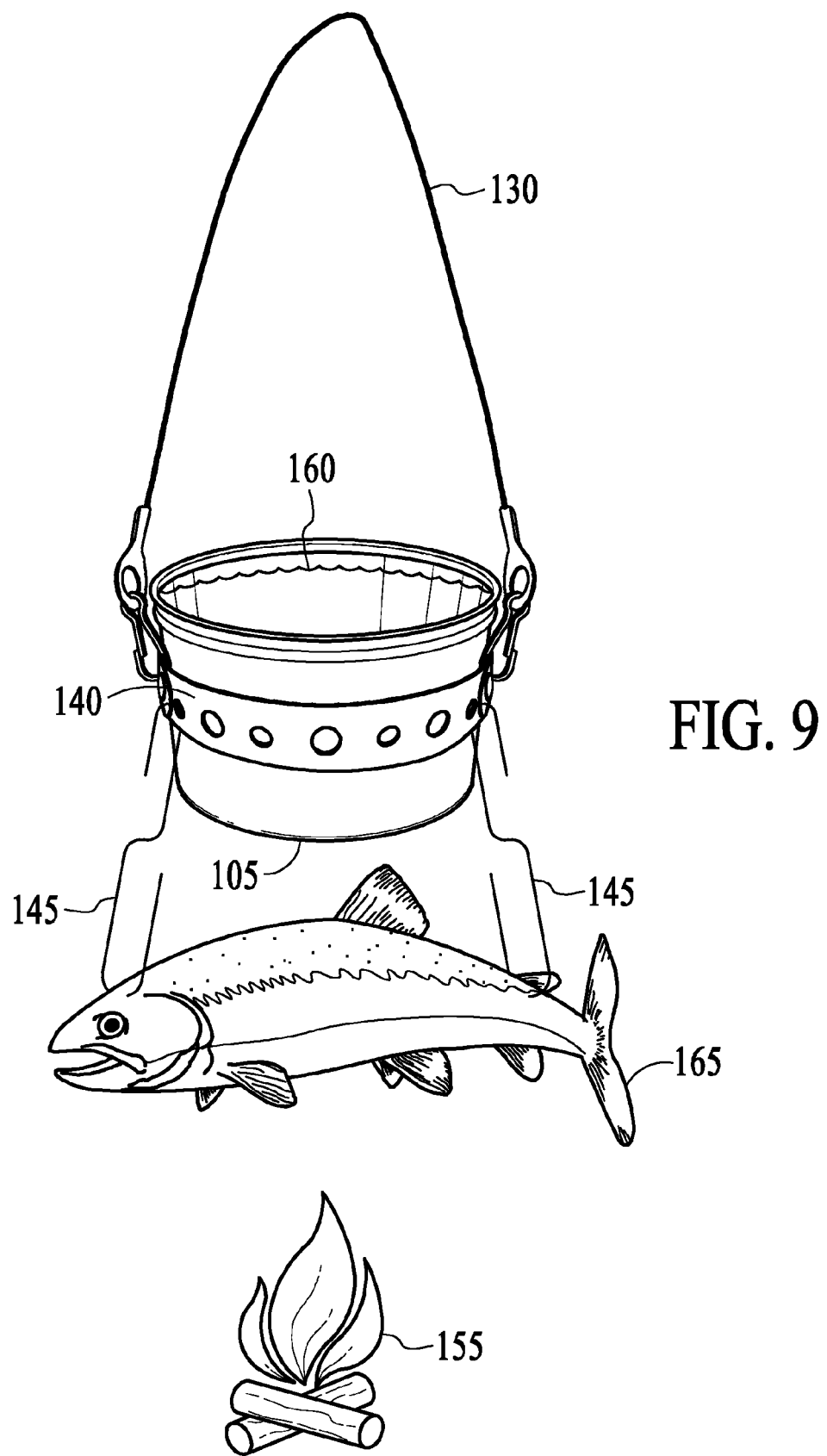
FIG. 9 is a perspective view of a sealable, metal container converted into a suspended kettle with lanyard having suspension tools utilized to suspend an edible material therefrom, comprising an embodiment of the present invention.

An alternative embodiment of the present invention provides an individual with the ability to heat/cook materials within the container 105 while simulatenouslly heating/cooking materials suspended from the container 105 and positioned over a fire 155. As illustrated in FIG. 9, a collapsible band 140 is removed from the container 105, expanded and then slidably engaged to the exterior circumference of the container 105. A wire saw 130 having a clasp 133 at each end is removed from the container 105 and attached to the collapsible band 140 by fitting a portion of the clasp 133 on each end thereof through one of the plurality of apertures that define the collapsible band 140, thereby allowing the container 105 to suspend over a fire 155. Furthermore, two paper clips 145, which previously had been placed in the container 105 for storage, are removed from the inside of the container 105 and reshaped so that each end thereof forms a hook. One end of each reshaped paper clip 145 is attached to the collapsible band 140 by fitting a portion of hooked end through one of the plurality of apertures which defines the collapsible band 140. The other end of each reshaped paper clip 145 is attached to edible material 165 by inserting a portion of the hooked end into the edible material 165 such as a fish. Thus, the edible material 165 can be cooked over a fire 155 while suspended simultaneously as material within the container 105 is heated and/or brought to a boil.

Figure 10:
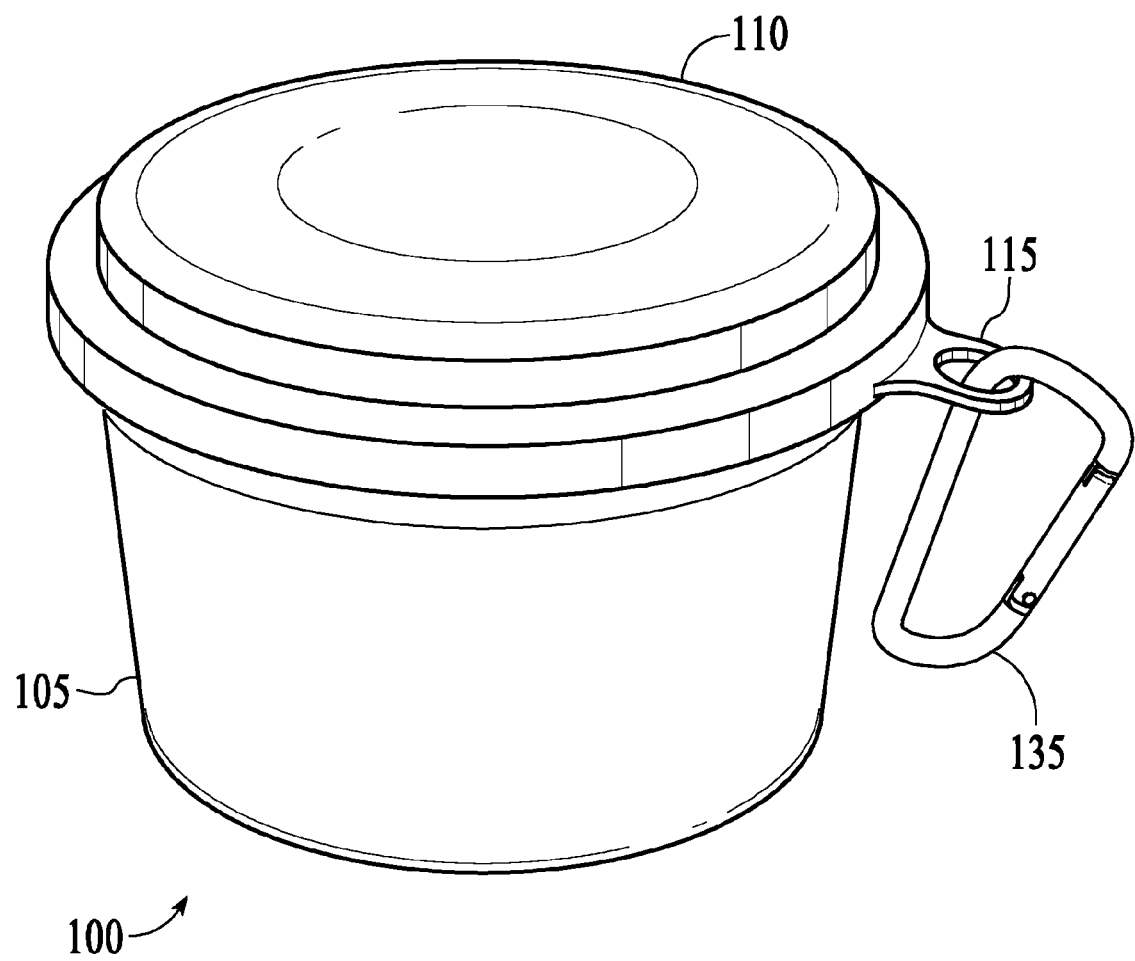
FIG. 10 is a perspective view of the kit of parts and system having a tool attached thereto to provide ease of transportability, comprising an embodiment of the present invention.
Figure 11:
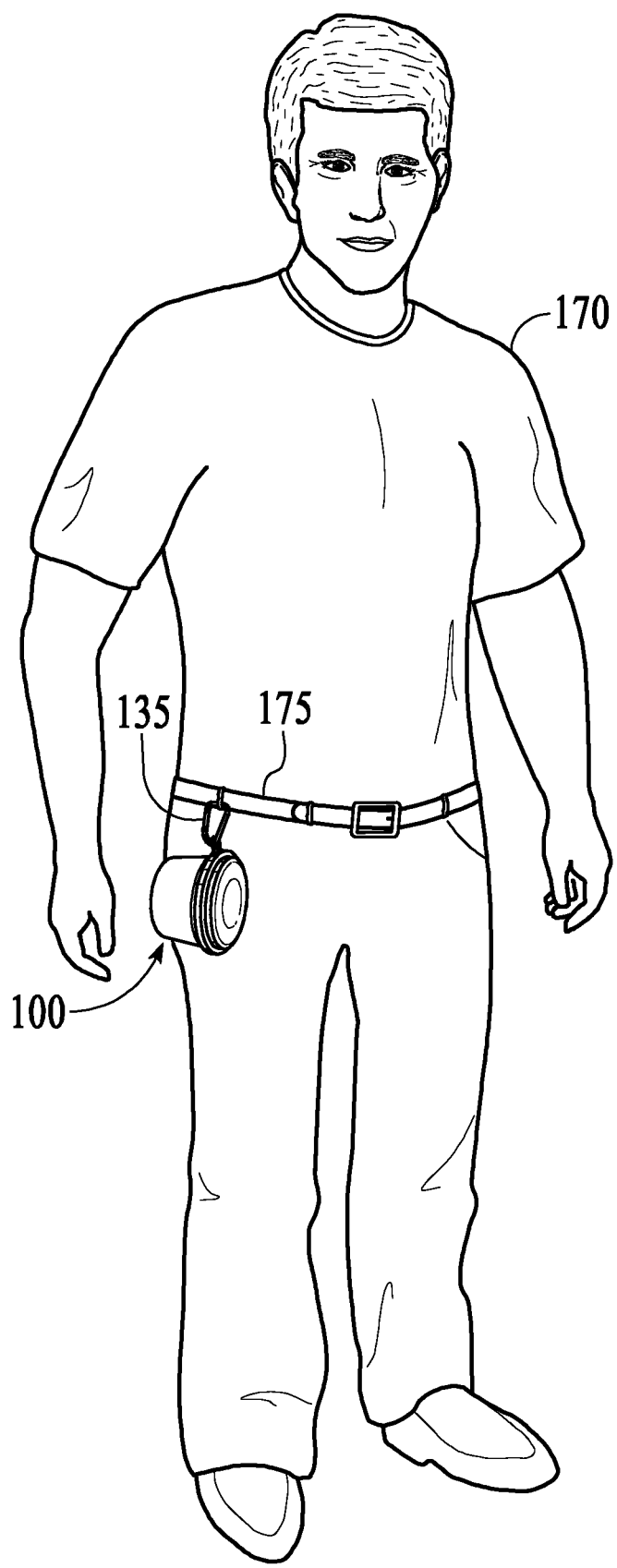
FIG. 11 is a perspective view depicting an embodiment of the present invention being transported with ease by an individual.

One of the many advantages of the present invention is its ease of transportability. FIG. 10 depicts a sealable, metal container 105 having various emergency items/tools/materials therein. A lid 110 having a finger 115 protruding therefrom is attached to the sealable, metal container 105. The finger 115 is defined by an aperture. A carabiner 135, which was previously stored within the container 105, is attached to the finger 115 of the lid 110 by fitting a portion of the carabiner 135 through the aperture. The carabiner 135 can then be used to connect to a separate object for transporting the present invention 100. For example, FIG. 11 depicts an individual 170 having an embodiment of the present invention 100 clipped to a belt 175 using the carabiner 135. Therefore, the individual 170 can move about an area without having to carry the present invention 100.

It should be understood that the present invention includes a kit of parts which may provided and/or sold. An individual will then use the sealable, metal container along with the emergency items/tools/materials stored therein to convert the container into different structural elements depending upon the specific needs of the individual. Furthermore, the container will contain emergency materials that an individual would likely need during an emergency such as, but not limited to, a flash light, medicines, etc. The present invention encompasses much of the needs that an individual may have while in an emergency situation and can be reused multiple times in a particular emergency situation or in multiple emergency situations.

As disclosed herein, the embodiments of the present invention apply to containers, regardless of type, function or properties, lids, regardless of type, function or properties, can openers, regardless of type, function or properties, wire saws, regardless of type, function or properties, carabiners, regardless of type, function or properties, paper clips, regardless of type, function or properties and collapsible bands, regardless of type, function or properties.

Although many embodiments of the present invention have been illustrated in the accompanying Drawings and described in the foregoing Detailed Description, it should be understood that the present invention is not limited to the embodiments disclosed, but is capable of numerous rearrangements, modifications, and substitution of parts and elements without departing from the spirit of the invention.

What is claimed is:

1. A kit of parts for providing survival assistance in an emergency, the kit of parts comprising:

a sealable container for storing emergency tools and materials therein;

a lid that removably attaches to the sealable container to seal emergency tools therein, the lid having a finger protruding therefrom, the finger defining an aperture thereon to permit the linking of an object thereto;

a collapsible band that, when expanded, slidably engages the exterior circumference of the sealable container and that, when collapsed, fits within the sealable container, the collapsible band defining a plurality of apertures thereon to permit the linking of an object thereto;

a carabiner that attaches to the collapsible band when the collapsible band is expanded and is engaged to the exterior circumference of the sealable container, thereby converting the sealable container into a cup with an arm for drinking liquids or a bucket with an arm for digging;

a first reshaped paper clip having two ends wherein each end thereof forms a hook such that one end thereof attaches to the collapsible band when the collapsible band is expanded and is engaged to the exterior circumference of the sealable container and the other end thereof attaches to an edible material, thereby suspending the edible material to allow simultaneous heating of the edible material and the sealable container;

a second reshaped paper clip having two ends wherein each end thereof forms a hook such that one end thereof attaches to the collapsible band when the collapsible band is expanded and is engaged to the exterior circumference of the sealable container and the other end thereof attaches to an edible material, thereby suspending the edible material to allow simultaneous heating of the edible material and the sealable container; and a wire saw having a clasp at each end for grasping wherein each clasp attaches to the collapsible band when the collapsible band is expanded and is engaged to the exterior circumference of the sealable container, thereby converting the sealable container into a kettle with lanyard for cooking edible material or a vessel with handles for transporting an object.

2. The kit of parts of claim 1 wherein the sealable container is comprised of metal.

3. The kit of parts of claim 2 wherein the collapsible band is comprised of metal.

* * * * *